United States Patent  [19]
Yamaguchi

[10] Patent No.: US 6,888,605 B2
[45] Date of Patent: May 3, 2005

(54) ELECTRO-OPTICAL DEVICE AND ELECTRONIC APPARATUS

(75) Inventor: Yoshio Yamaguchi, Nagano-ken (JP)

(73) Assignee: Seiko Epson Corporation (JP)

( * ) Notice: Subject to any disclaimer, the term of this patent is extended or adjusted under 35 U.S.C. 154(b) by 483 days.

(21) Appl. No.: 09/960,871

(22) Filed: Sep. 21, 2001

(65) Prior Publication Data
US 2002/0060833 A1 May 23, 2002

(30) Foreign Application Priority Data

Sep. 22, 2000 (JP) .......................... 2000-288463
Aug. 30, 2001 (JP) .......................... 2001-261571

(51) Int. Cl.$^7$ .......................................... G02F 1/1345
(52) U.S. Cl. ...................... 349/149; 349/153; 257/432
(58) Field of Search .................. 349/84, 139, 149–154; 257/98, 428, 431–435

(56) References Cited

U.S. PATENT DOCUMENTS 5,757,450 A * 5/1998 Fujii et al. .................. 349/106
6,300,997 B1 * 10/2001 Saito et al. .................. 349/149
6,466,294 B1 10/2002 Yamagishi et al.
6,525,718 B1 * 2/2003 Murakami et al. .......... 345/206

FOREIGN PATENT DOCUMENTS

| JP | 09-138405 | 5/1997 |
| JP | 09-318962 | 12/1997 |
| JP | 11-326933 | 11/1999 |
| JP | 2000-221515 | 8/2000 |

* cited by examiner

Primary Examiner—Carl Whitehead, Jr.
Assistant Examiner—Thanhha Pham
(74) Attorney, Agent, or Firm—Harness, Dickey & Pierce, P.L.C.

(57) ABSTRACT

An electro-optical device comprising, a first board and a second board superposed on each other; a seal 6 for bonding the first board and the second board at the periphery of a display area; a plurality of connection terminals 71 provided on an overhang of the first board which extends from the second board; and a plurality of connection wires 70 provided on the first board and interconnecting the display area and the plurality of connection terminals 71. The distance between adjacent connection wires 119b is set to be smaller inside the seal 6 than outside the seal 6. This prevents the occurrence of corrosion in the connection wires 70 lying outside the seal 6, and shortens the distance between adjacent connection wires 70 lying inside the seal 6, thereby reducing the overall size of the liquid crystal device.

5 Claims, 14 Drawing Sheets

[FIG. 1]
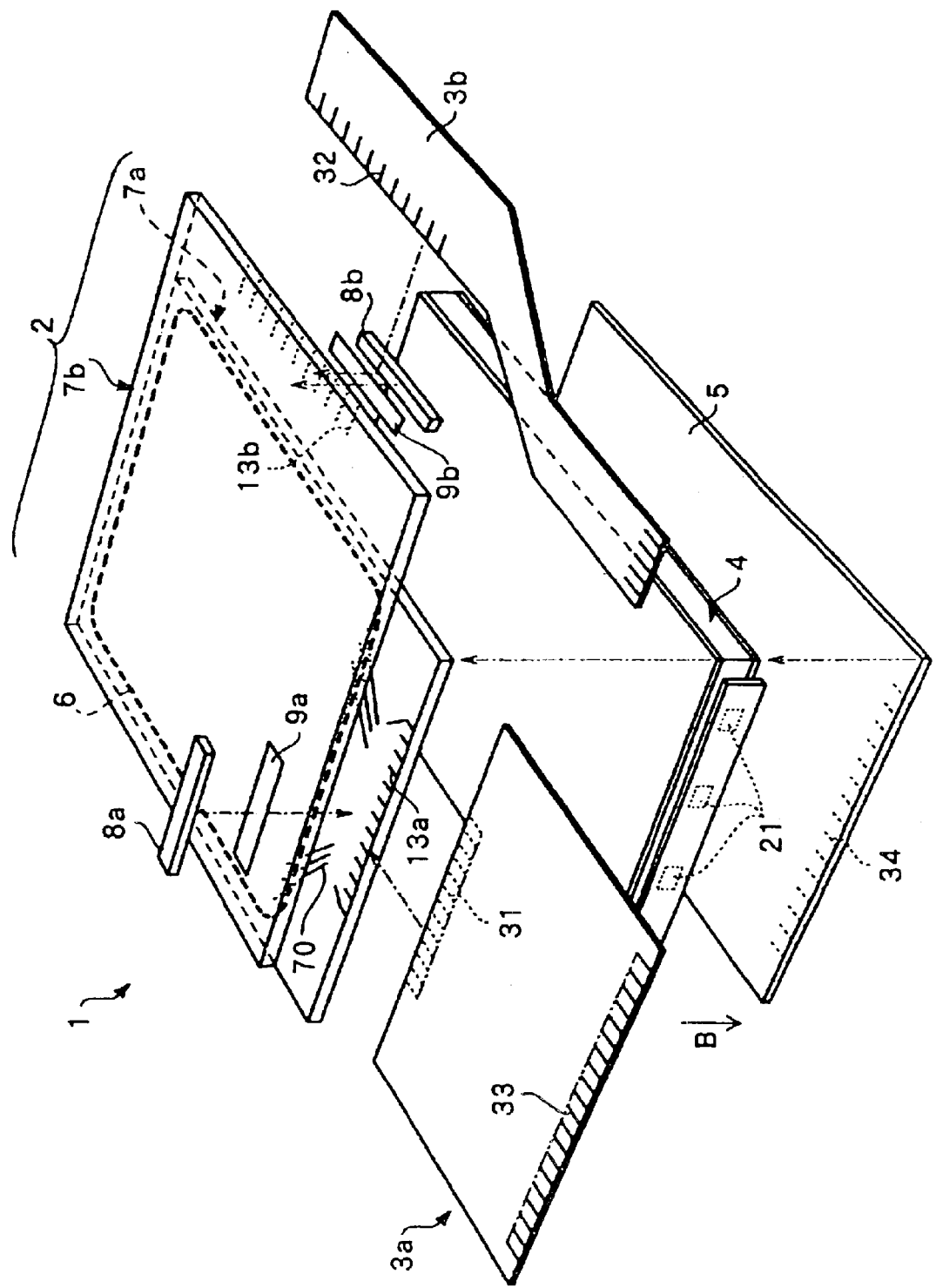

[FIG. 2]
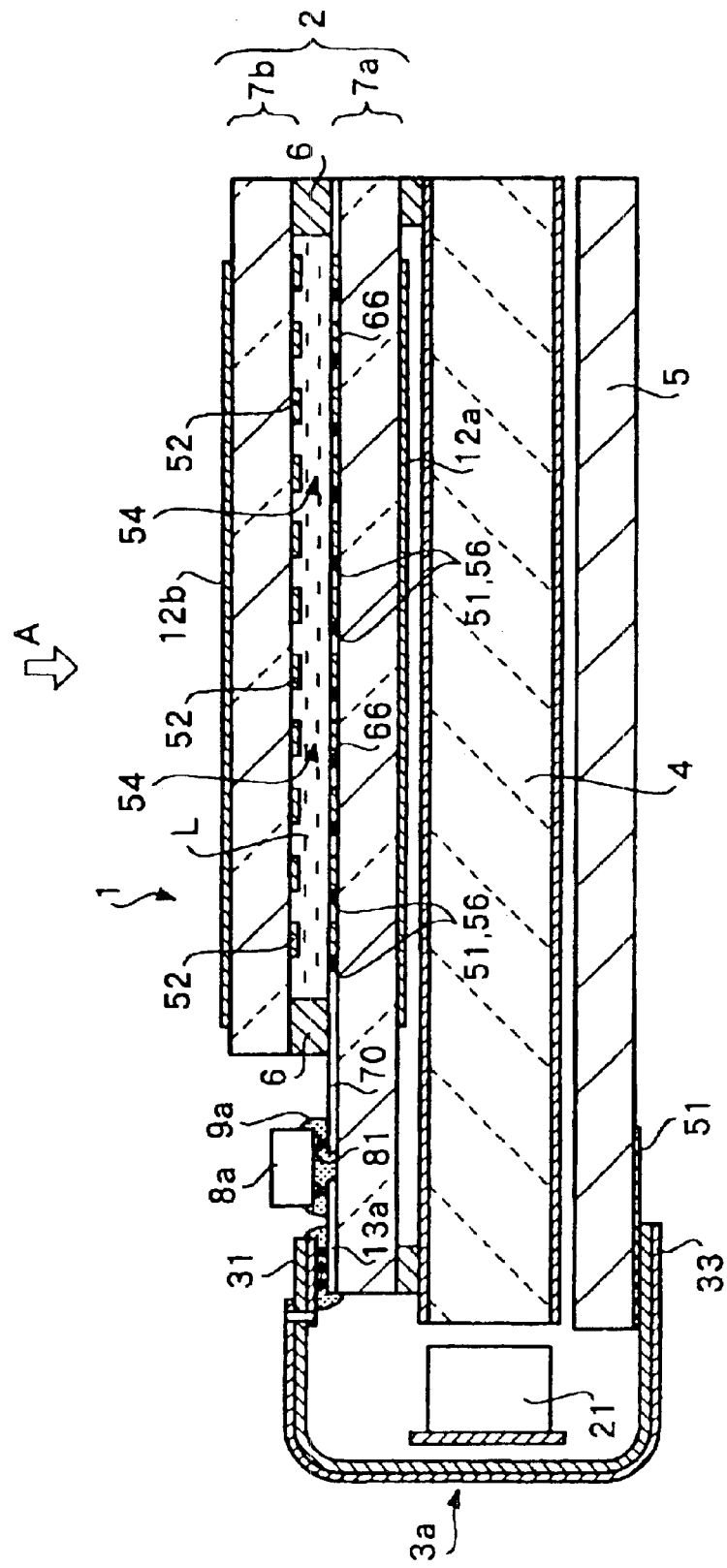

[FIG. 3]
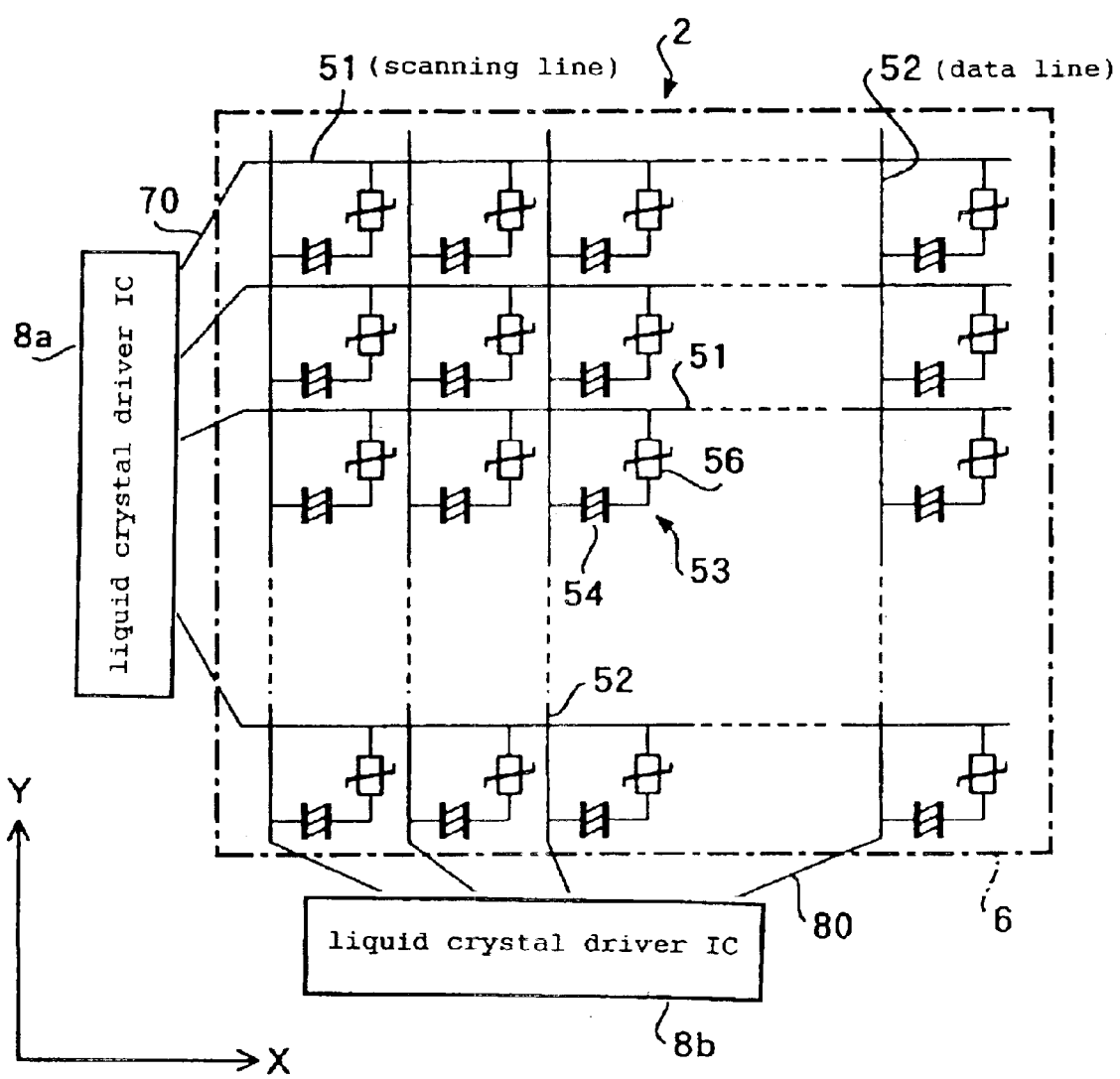

[FIG. 4]
(a)
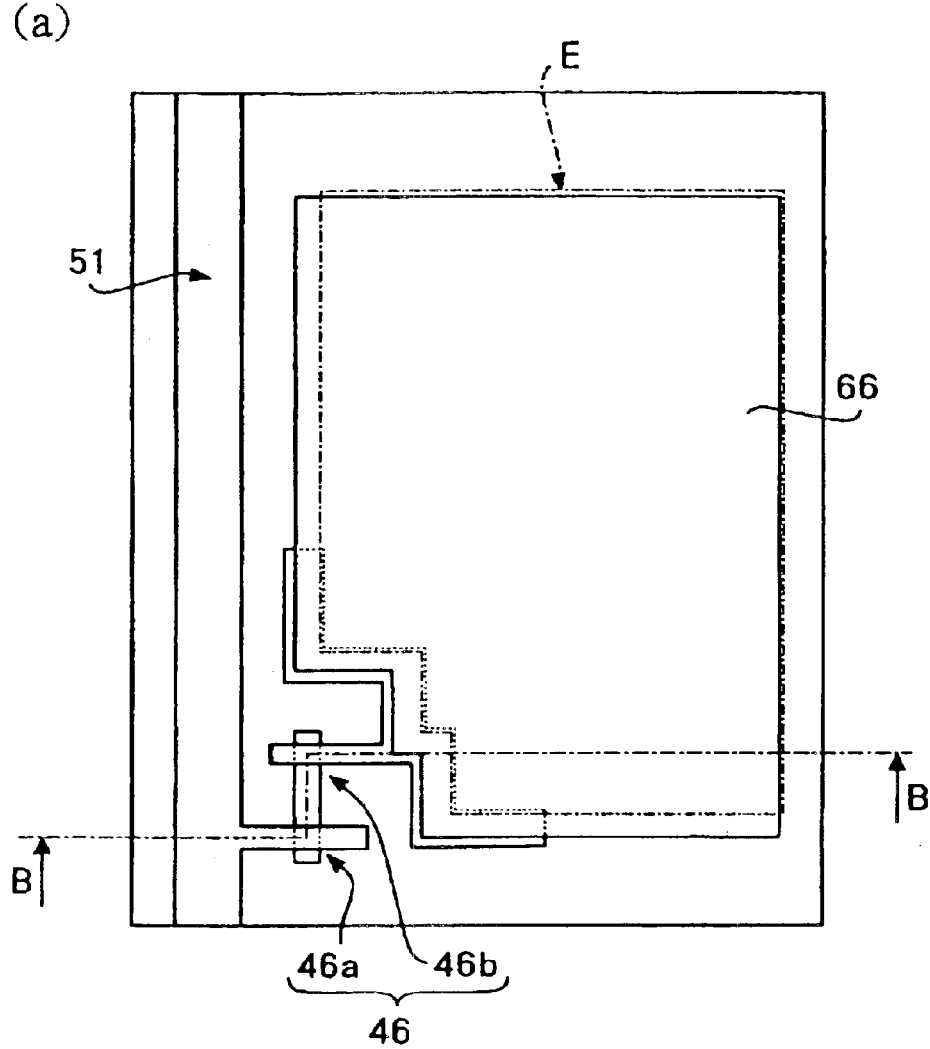
(b)
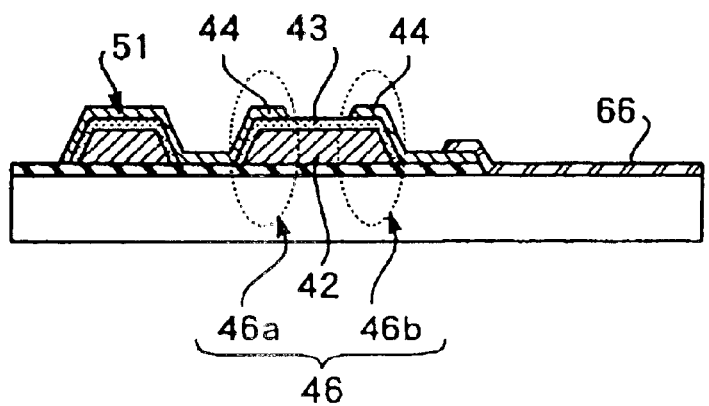

[FIG. 5]
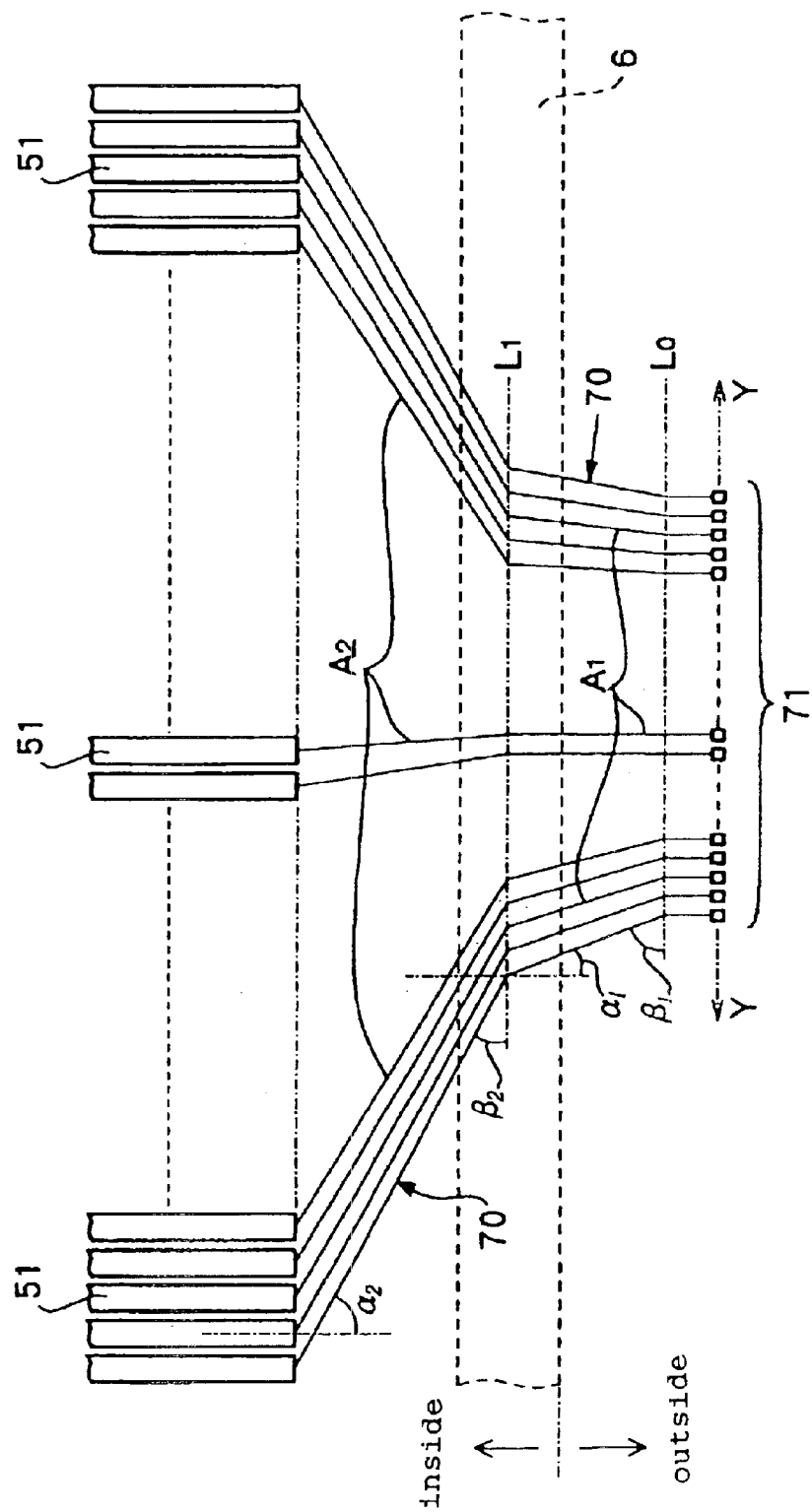

[FIG. 6]
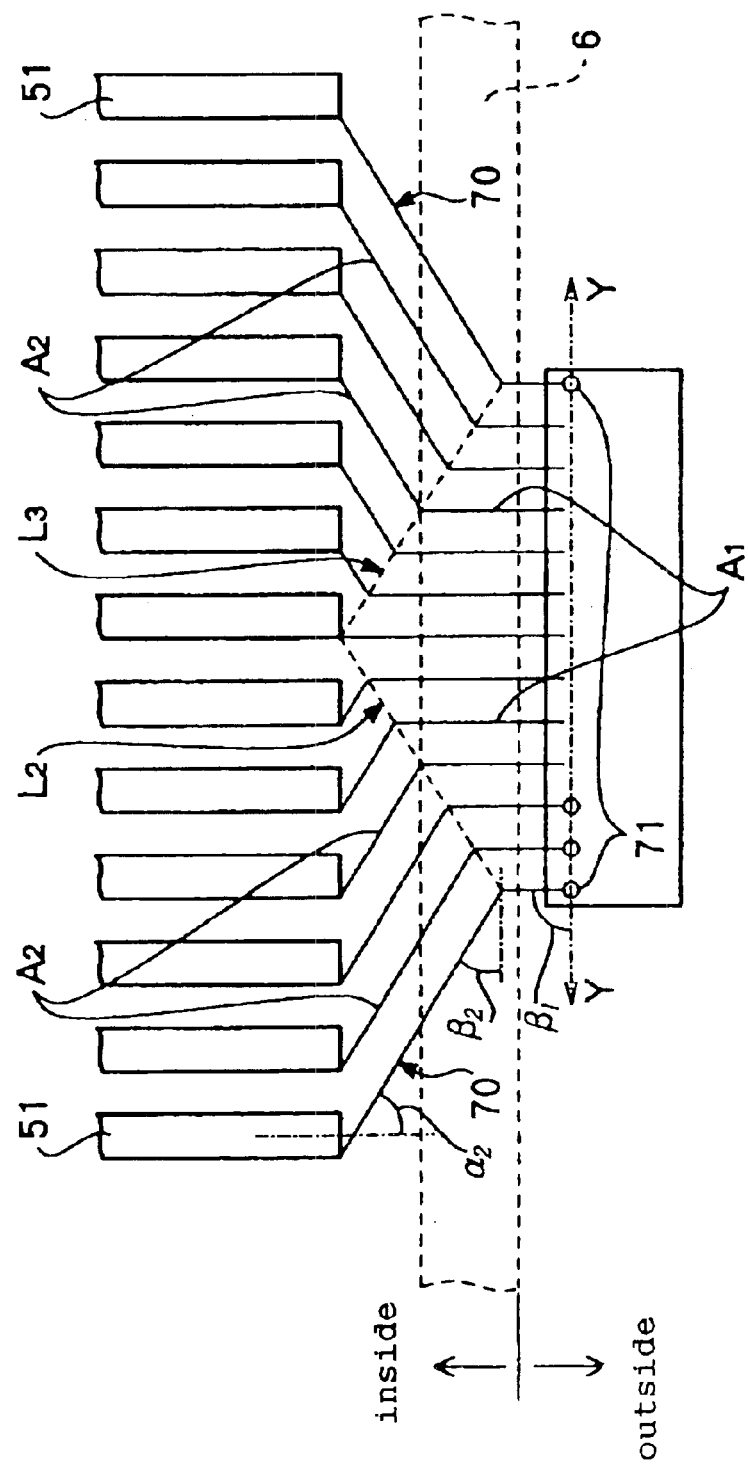

[FIG. 7]
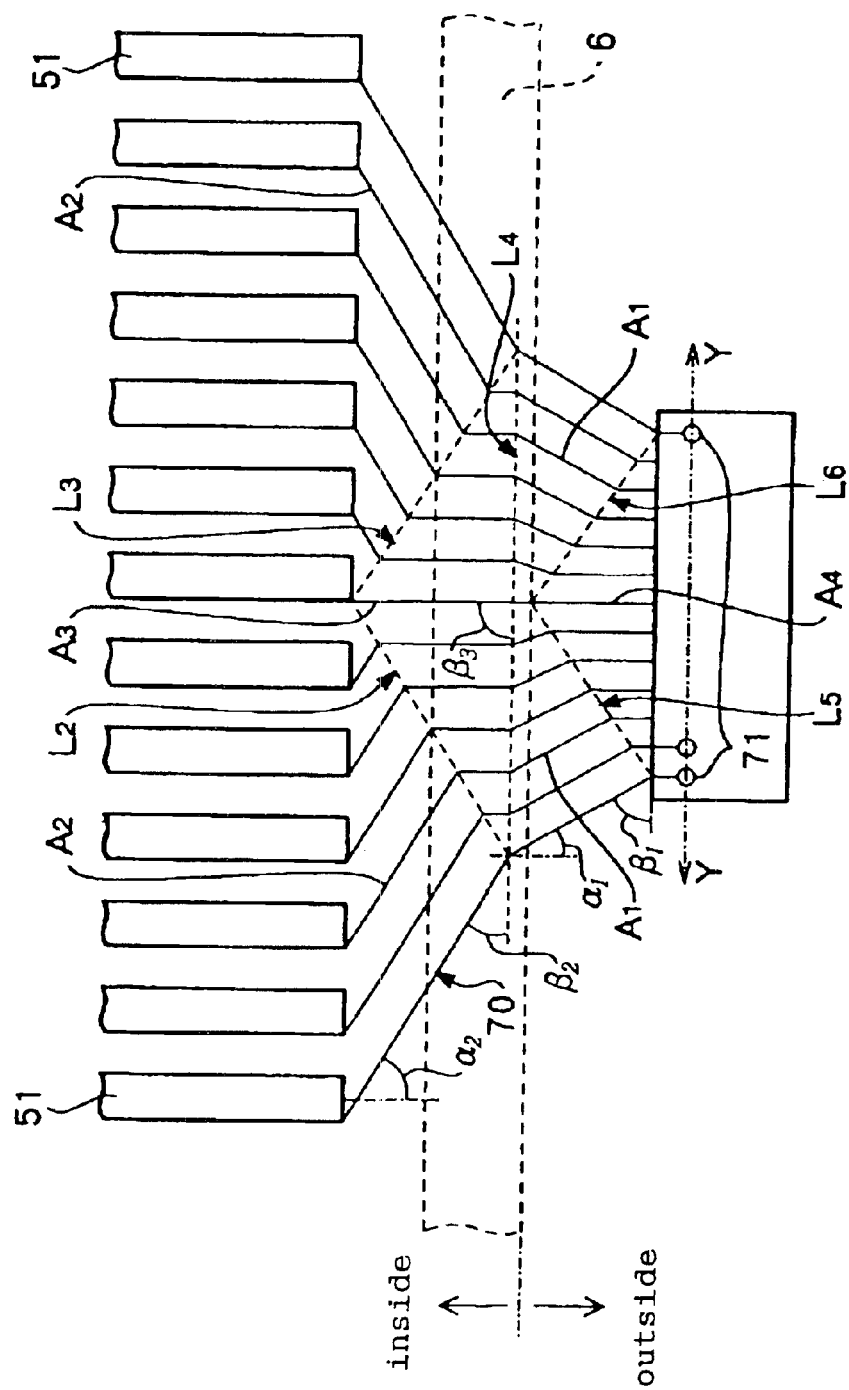

[FIG. 8]
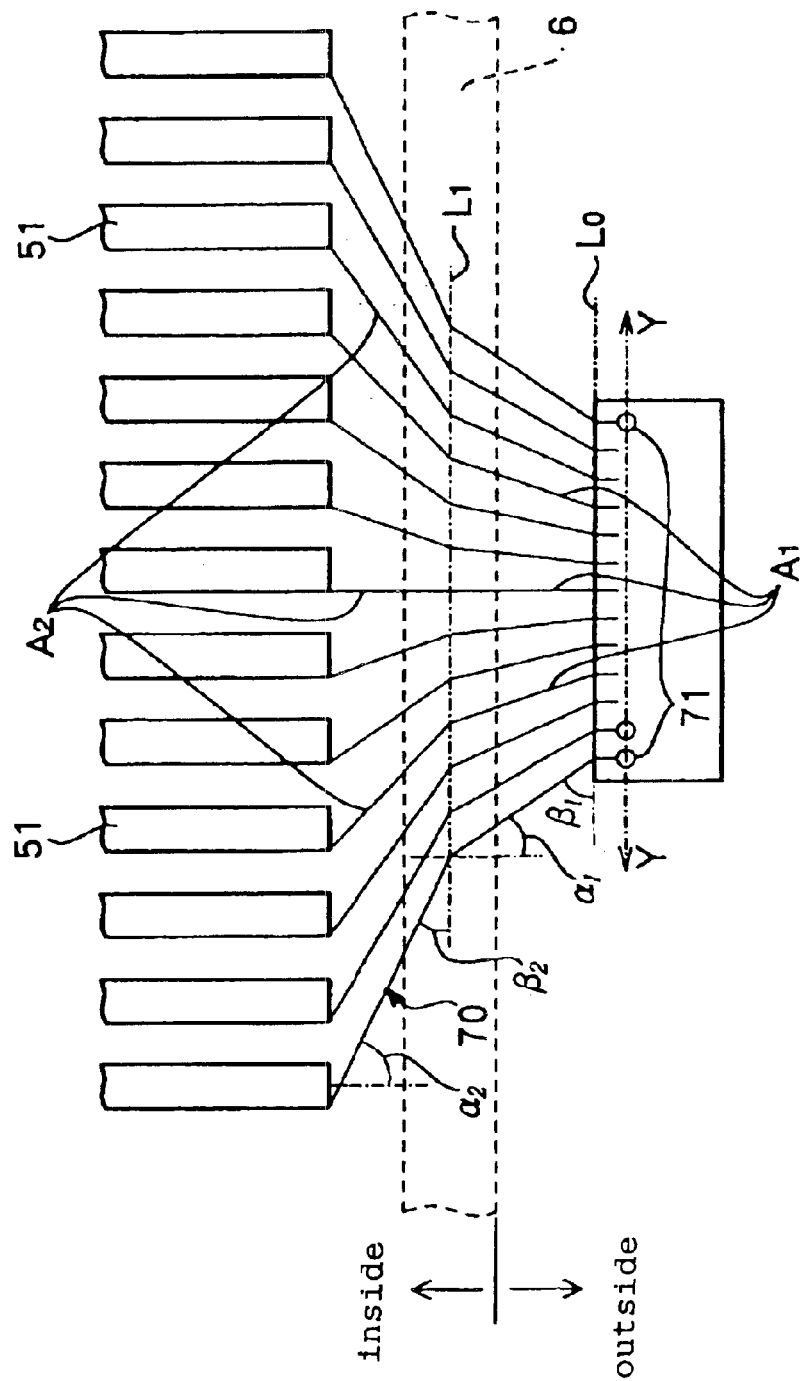

[FIG. 9]
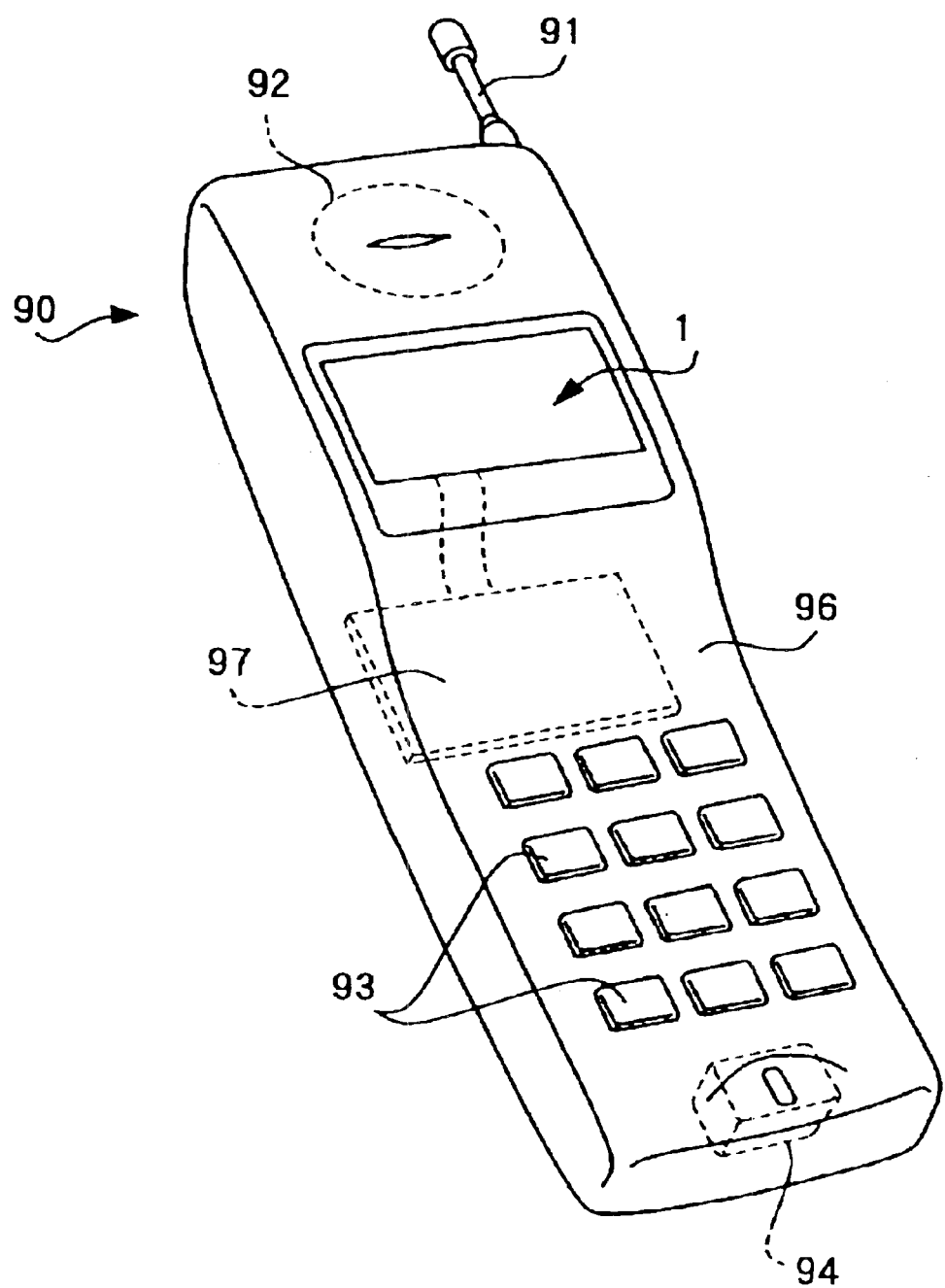

[FIG. 10]
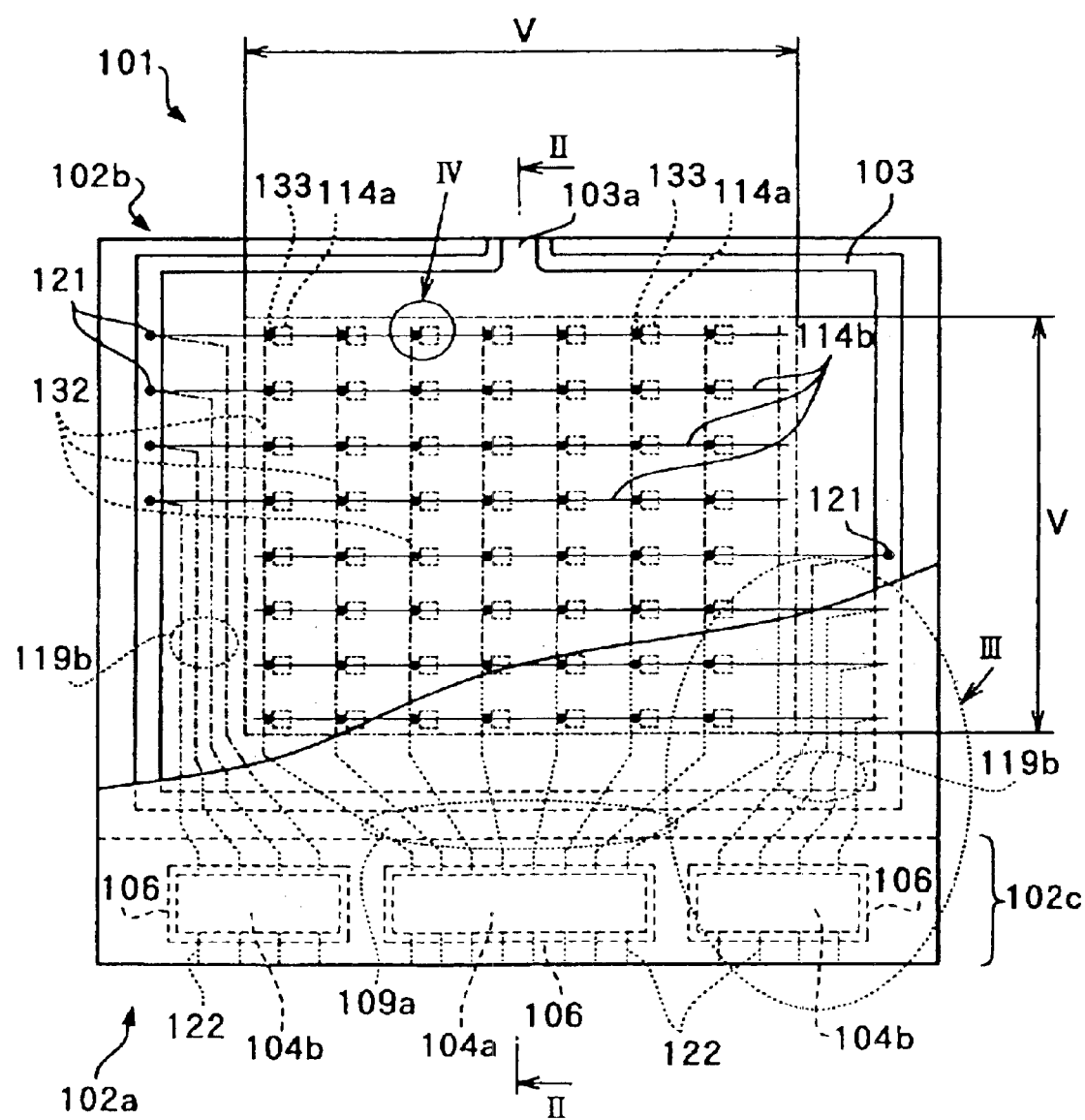

[FIG. 11]
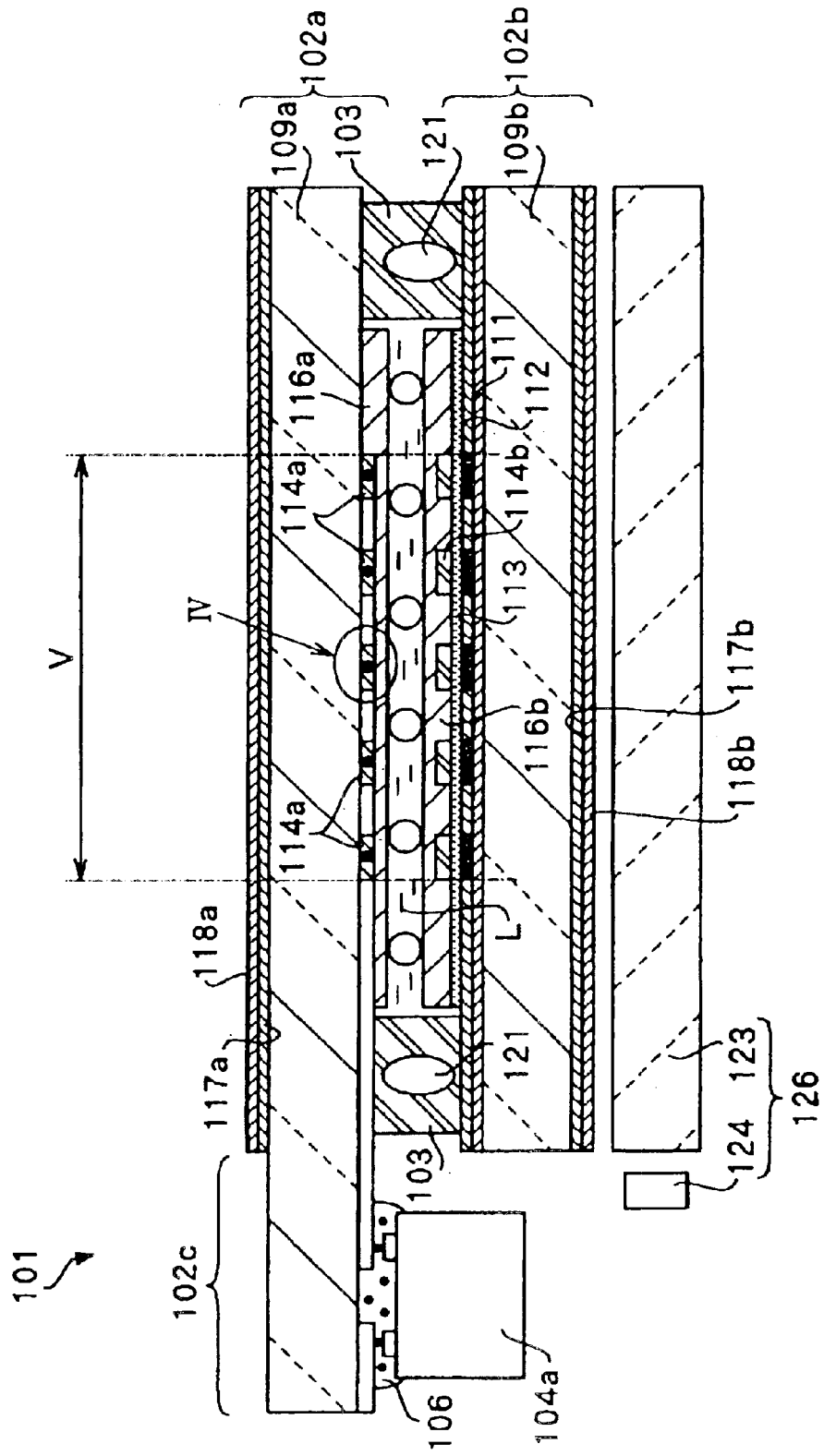

[FIG. 12]
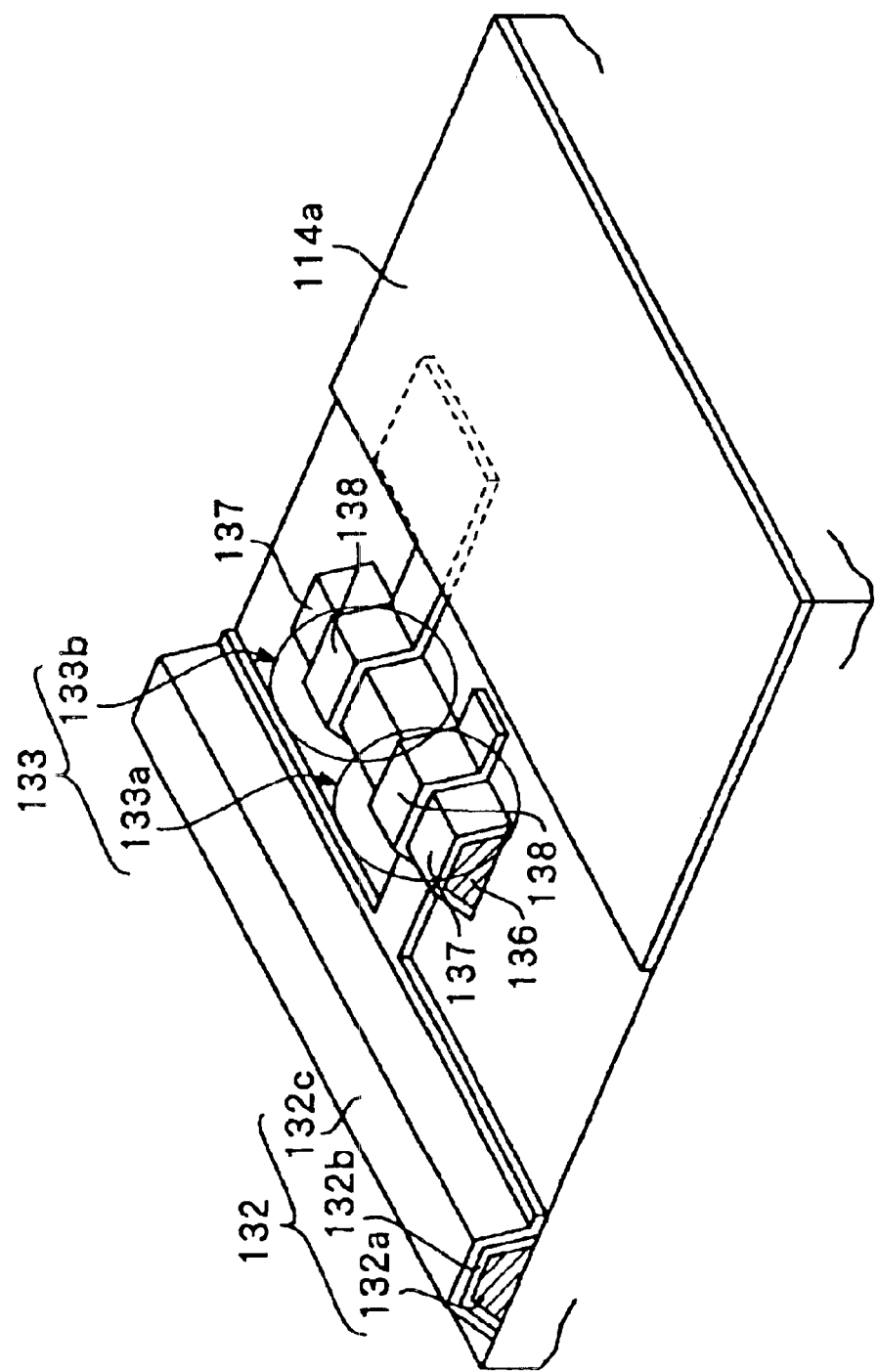

[FIG. 13]
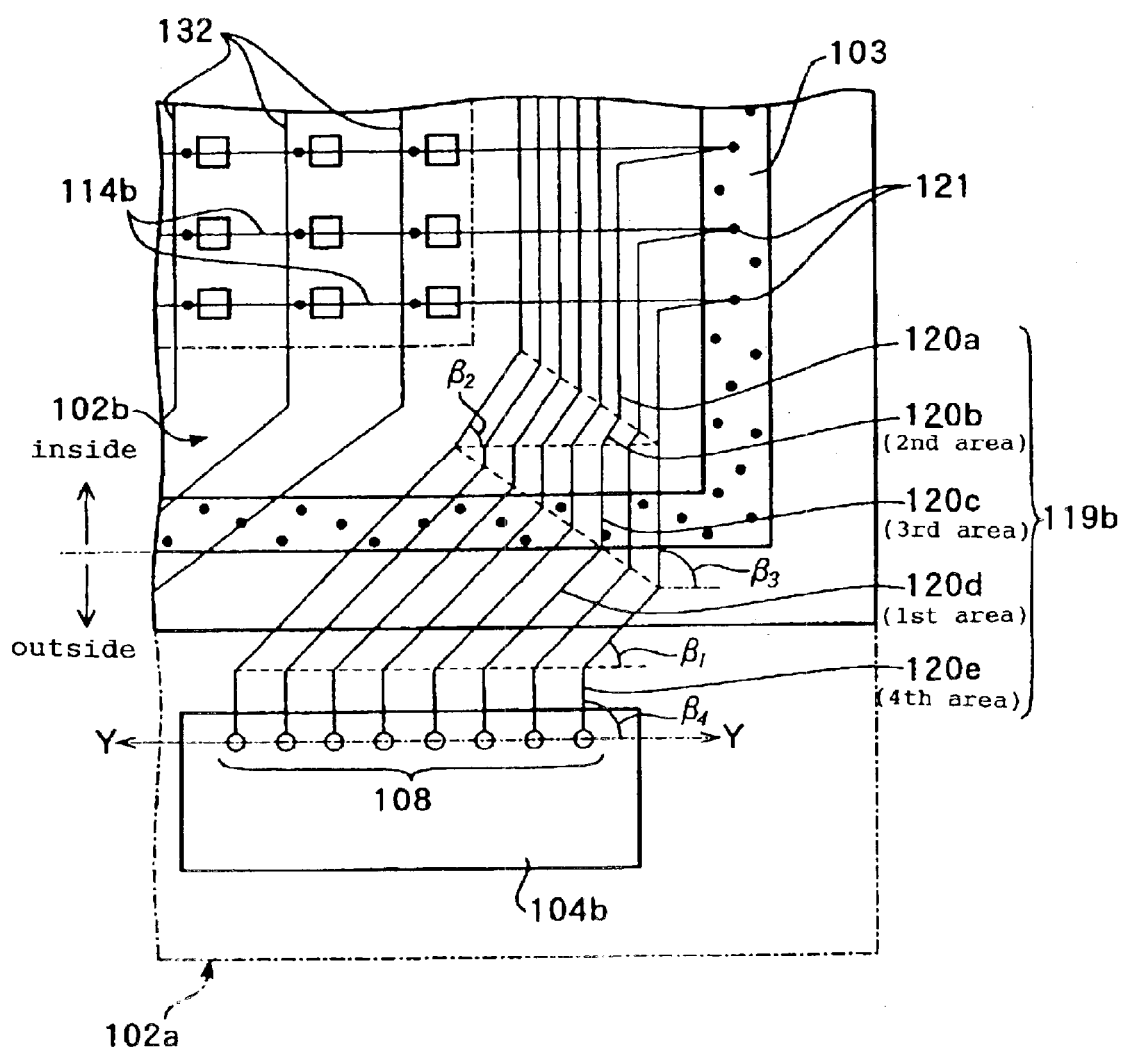

[FIG. 14]
(a)
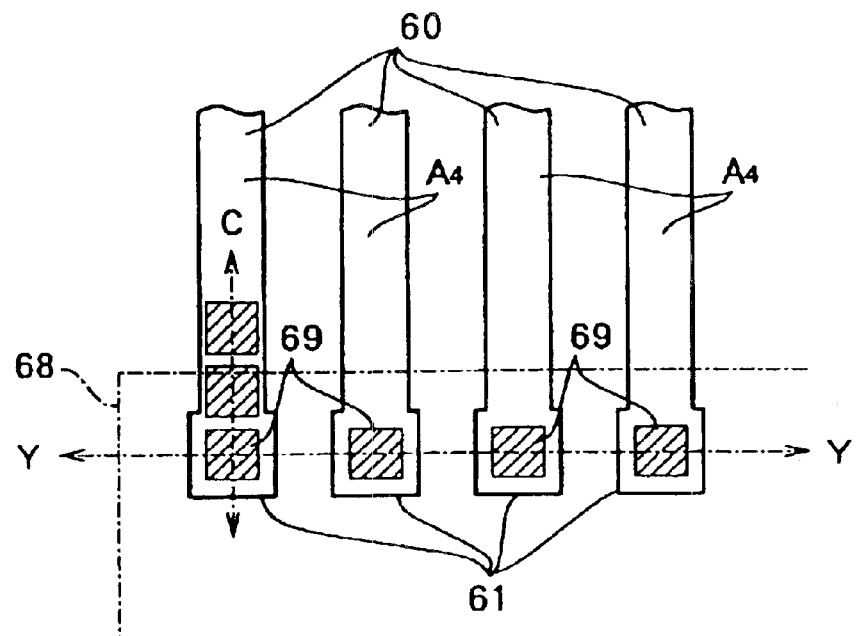
(b)
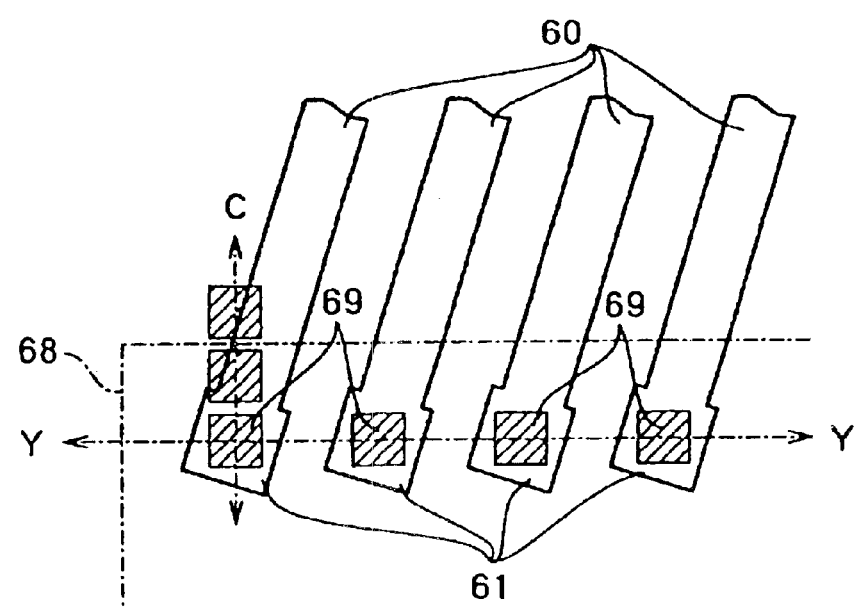

ELECTRO-OPTICAL DEVICE AND ELECTRONIC APPARATUS

TECHNICAL FIELD

The present invention relates to an electro-optical device that has a plurality of connection wires to interconnect a display area formed inside a seal and a plurality of connection terminals formed outside the seal, and also to an electronic apparatus using the electro-optical device.

BACKGROUND ART

In a liquid crystal device having a pair of boards between which a liquid crystal is enclosed, the boards are superposed on each other and bonded together by a seal formed at the periphery of a display area. Internal space between the pair of boards and surrounded by the seal is filled with the liquid crystal. In a matrix-type liquid crystal device, a plurality of display lines is arranged parallel to the display area. A plurality of connection wires formed on the boards is connected to the corresponding display lines at one end of the connection wires and is led outside of the seal. Connection terminals are formed at the other end of the connection wires. In a so-called COG (Chip On Glass) liquid crystal device, output terminals, i.e., bumps of a liquid-crystal-panel driver IC, are connected to the corresponding connection terminals.

Generally, the distance between adjacent bumps of the liquid-crystal-panel driver IC is different from that of adjacent display lines in the display area. The connection wires, which interconnect these bumps and display lines, are therefore formed in a manner that the distance between adjacent connection wires increases from the pair of bumps to the corresponding pair of display lines or vice versa.

In the specification, the terms "distance" and "spacing" refer to the distance between the centers of the adjacent objects and the space formed between the adjacent objects, respectively.

The distance between adjacent bumps of liquid-crystal-panel driver IC is generally fixed regardless of the width of the display area. When the display area is designed to be wide or large in size, the difference between the distance between adjacent display lines constituting the display area and the distance between adjacent bumps of the liquid-crystal-panel driver IC becomes significantly large. This difference becomes even significantly larger when a liquid-crystal-panel driver IC having a narrow bump distance is used.

The difference in these distances can be eliminated by forming connection wires in a manner that each distance between adjacent connection wires diverges in the predetermined direction; however, the connection wires have the limit for the tilt angle thereof. That is, an excessively large tilt angle reduces the distance between adjacent connection wires, thereby resulting in reducing the spacing between adjacent connection wires. Consequently, this possibly leads to occurrence of damage such as corrosion. This indicates that the tilt angle of the connection wires is limited.

The problem of the above-mentioned corrosion can be solved by making the tilt angle of the connection wires smaller. However, the smaller the tilt angle becomes, the larger the distance between the display area and the liquid-crystal-panel driver IC becomes. This consequently requires larger mounting space around the display area, thereby giving rise to a problem wherein the liquid crystal device becomes larger relative to the display area.

SUMMARY OF THE INVENTION

An object of the present invention is to achieve miniaturization of an electro-optical device and an electronic apparatus while suppressing occurrence of damage such as corrosion.

(1) In order to achieve the above-described object, an electro-optical device of the present invention comprises a first board and a second board superposed on each other, a seal for bonding the first board and the second board at the periphery of a display area, a plurality of connection terminals provided on an overhang of the first board which extends from the second board, and a plurality of connection wires provided on the first board, interconnecting the display area and the plurality of connection terminals, wherein the distance between the connection wires is smaller inside the seal than outside the seal.

According to the electro-optical device, the distance between the connection wires is smaller inside the seal than outside the seal. With this configuration, the distance between the connection wires is large in an area outside the seal where damage such as corrosion is likely to occur, resulting in large spacing between the connection wires. Accordingly occurrence of corrosioncan be prevented.

The distance between the connection wires, on the other hand, is small in an area inside of the seal where damage such as corrosion is not likely to occur. This leads to a small distance between the display area and the connection terminals, thereby reducing the overall planar size of the electro-optical device.

In other words, the above-described configuration can reduce the overall planar size of the electro-optical device while suppressing damage such as corrosion. With the above-described configuration, in the area inside the seal, the distance between the connection wires can be shortened to a possible extent from the view point of production, e.g., to an extent such that the distance is determined by a resist resolution in a patterning process. Outside the seal, the distance between the connection wires can also be determined to an extent such that the spacing between the connection wires is ensured so as to prevent damage such as corrosion.

Also with the above-described configuration, the bumps of the electro-optical-panel driver IC or terminals formed on a flexible printed circuit board may be connected to the connection terminals. When the terminals formed on the flexible printed circuit board are connected, the electro-optical device is connected to an outer circuit through the connection terminals.

The electro-optical device with the above-described configuration can broadly be applicable to various electro-optical devices such as a liquid crystal device, a plasma display device, and an electro-luminescence display device.

(2) Another electro-optical device of the present invention comprises a first board and a second board superposed on each other, a seal for bonding the first board and the second board at the periphery of a display area, a plurality of connection terminals provided on an overhang of the first board which extends from the second board, and a plurality of connection wires provided on the first board, each interconnecting each of a plurality of display lines formed in the display area and each of the plurality of connection terminals, wherein the distance between the connection wires is smaller inside the seal than outside the seal.

The electro-optical device with this configuration differs from that with the configuration stated in (1) in that the former has a plurality of display lines formed on the display area and the connection wires connected to the display lines.

According to the electro-optical device, the distance between the connection wires is smaller inside the seal than outside the seal. With this configuration, the distance between the connection wires is large in an area outside the seal where damage such as corrosion is likely to occur, resulting in large spacing between the connection wires. Consequently, occurrence of corrosion can be prevented.

The distance between the connection wires, on the other hand, is small in an area inside of the seal where damage such as corrosion is not likely to occur. This leads to a small distance between the display area and the connection terminals, thereby reducing the overall planar size of the electro-optical device.

In other words, the above-described configuration can reduce the overall planar size of the electro-optical device while suppressing damage such as corrosion. With the above-described configuration, in the area inside the seal, the distance between the connection wires can be shortened to a possible extent from the view point of production, e.g., to an extent such that the distance is determined by a resist resolution in a patterning process. Outside the seal, the distance between the connection wires can also be determined to an extent such that the spacing between the connection wires is ensured so as to prevent damage such as corrosion.

Also with the above-described configuration, the bumps of the electro-optical-panel driver IC or terminals formed on a flexible printed circuit board may be connected to the connection terminals. When the terminals formed on the flexible printed circuit board are connected, the electro-optical device is connected to an outer circuit through the connection terminals.

The electro-optical device with the above-described configuration can broadly be applicable to various electro-optical devices such as a liquid crystal device, a plasma display device, and an electroluminescence display device.

(3) In an electromechanical device of the present invention having features stated in (2), a tilt angle of the connection wires with respect to the display lines is larger inside the seal than outside the seal.

With this configuration, the distance between the connection wires can be significantly changed inside the seal while the connection wire length is restrained with respect to the extending direction of the display lines. The distance between the connection wires can be enlarged outside the seal.

(4) In an electro-optical device of the present invention having features stated in (2) or (3), the distance between the connection terminals is smaller than that between the display lines.

(5) In an electro-optical device of the present invention having features stated in any one of (1) to (4), output terminals of an electro-optical panel driver IC are connected to the connection terminals in the stated configuration. With this configuration, the distance between the connection terminals is the same as that between the output terminals of the electro-optical-panel driver IC. A liquid crystal panel and an organic EL panel can be listed as an electro-optical panel.

(6) In an electro-optical device of the present invention having features stated in any one of (1) to (5), spacing between the connection wires is larger outside the seal than inside the seal. With this configuration, the enlarged spacing between the connection wires outside the seal can effectively prevent occurrence of damage such as corrosion.

(7) An electronic apparatus of the present invention comprises an electro-optical device having features stated in any one of (1) to (6), a housing for housing the electro-optical device, and control means for controlling operations of the electro-optical device. A mobile phone and a mobile information terminal are listed as an electronic apparatus of this type.

(8) An electro-optical device of the present invention comprises a first board and a second board superposed on each other, a seal for bonding the first board and the second board at the periphery of a display area, conductive particles which are contained in the seal, a plurality of connection terminals provided on an overhang of the first board which extends from the second board, and a plurality of connection wires provided on the first board, connected to the plurality of connection terminals and extending through the seal, wherein the distance between the connection wires is smaller inside the seal than outside the seal, and the distance between the connection wires is larger in an area where the seal is proved than inside the seal.

According to the electro-optical device, the conductive particles being present in the seal electrically interconnect a conductive pattern formed on the first board and a conductive pattern formed on the second board.

In addition, according to the electro-optical device, the enlarged distance between adjacent connection wires in the area where the seal is provided prevents the conductive particles contained in the seal from causing short-circuiting of the adjacent connection wires lying in the area extending through the seal.

(9) An electronic apparatus of the present invention comprises a board, an electro-optical layer supported by the board and disposed at least in a display area, a seal provided at the periphery of the electro-optical layer, a plurality of connection terminals provided at an end of the board, and a plurality of connection wires provided on the board, interconnecting the display area and the plurality of connection terminals, wherein the plurality of connection wires is bent more acutely inside the seal than outside the seal such that the distance between the connection wires is smaller inside the seal than outside the seal.

(10) An electronic apparatus of the present invention comprises a board, an electro-optical layer supported by the board and is disposed at least in a display area, a seal provided at the periphery of the electro-optical layer, a plurality of connection terminals provided at an end of the board and arrayed along a predetermined direction, and a plurality of connection wires provided on the board, each interconnecting each of a plurality of display lines formed in the display area and each of the plurality of connection terminals, wherein the plurality of connection wires each lies in a first area and a second area, the wires in the first area lying at least partly outside the seal and forming a first angle that is an acute angle with respect to the predetermined direction, the wires in the second area lying inside the seal and forming a second angle that is an acute angle with respect to the predetermined direction, and wherein the second angle is smaller than the first angle, and also the distance between the connection wires is smaller in the second area than in the first area.

(11) An electronic apparatus of the present invention comprises a board, an electro-optical layer supported by the board and disposed at least in a display area, a seal provided at the periphery of the electro-optical layer, a plurality of connection terminals provided at an end of the board and arrayed along a predetermined direction, and a plurality of connection wires provided on the board and connected to the plurality of connection terminals, wherein the plurality of connection wires each lies in a first area, a second area, and a third area, the connection wires in the first area lying at least partly outside the seal and forming a first angle that is an acute angle with respect to the predetermined direction, the connection wires in the second area lying inside the seal and forming a second angle that is an acute angle with respect to the predetermined direction, the connection wires in the third area connected to the connection wires in the first area and in the second area and forming an third angle that is an acute angle with respect to the predetermined direction, and wherein the third angle is larger than the first and the second angles, the first and the second angles are different from each other, and the distance between the connection wires is smaller in the second area than in the first area.

(12) In an electro-optical device of the present invention having features stated in (11), the plurality of connection wires each also lies in a fourth area, connected to the connection wires in the first area and the corresponding connection terminals, and being substantially orthogonal to the predetermined direction.

In the electro-optical device with this configuration, the connection wires 60 in the fourth area A4 extend in a direction substantially orthogonal to the arranging direction Y of the connection terminals 61 as shown in FIG. 14(*a*). When the fourth area is not provided, however, the connection wires 60 extend at a slant to the arranging direction Y of the connection terminals 61 as shown in FIG. 14(*b*).

The connection terminals 61 contact bumps 69 of a driver IC 68 so as to connect the connection wires 60 to the driver IC 68. When the driver IC 68 is bonded in a position dislocatedto a direction orthogonal to the arranging direction Y of the connection terminals 61, the bumps 69 are accordingly dislocatedto a direction orthogonal to the arranging direction of the connection terminals 61 as indicated by an arrow C in FIGS. 14(*a*) and 14(*b*).

When the connection wires 60 are aligned at a slant as shown in FIG. 14(*b*), the bumps 69 dislocated as indicated by the arrow C deviate easily from the terminals 61 of the connection wires 60. In other words, a large space for dislocation of the bonding position of the driver IC 68 is not allowable. However, when the fourth area A4 extending in a direction orthogonal to the arranging direction Y of the connection terminals 61 is provided as shown in FIG. 14(*a*), the bumps 69 are unlikely to deviate from the connection wires 60 even with the bumps 69 dislocated in the direction of the arrow C. That is, the large space for dislocation of the bonding position of the driver IC 68 is allowable.

(13) In an electro-optical device of the present invention having features stated in (12), the third angle is substantially 90°.

(14) In an electro-optical device of the present invention having features stated in (11), the second angle is smaller than the first angle.

(15) In an electro-optical device of the present invention having features stated in (11), two adjacent connection wires among the plurality of connection wires are arranged to be substantially in parallel in the first, the second, and the third areas.

(16) An electro-optical device of the present invention comprises a board, an electro-optical layer supported by the board and disposed at least in a display area, a seal provided at the periphery of the electro-optical layer, a plurality of connection terminals provided at an end of the board, and a plurality of connection wires provided on the board, each interconnecting each of a plurality of display lines formed in the display area and each of the plurality of connection terminals, wherein the plurality of connection wires each lies in a first area and a second area, the connection wires in the first area lying at least partly outside the seal and forming a first angle that is an acute angle with respect to the display lines, the connection wires in the second area lying inside the seal and forming a second angle that is an acute angle with respect to the display lines, and wherein the plurality of connection wires is each bent at the boundary between the first and the second areas so that the second angle is larger than the first angle.

BRIEF DESCRIPTION OF THE DRAWINGS

FIG. 1 is an exploded perspective view of an embodiment of a liquid crystal device as an example of an electro-optical device according to the present invention.

FIG. 2 is a sectional view showing a sectional structure of the liquid crystal device shown in FIG. 1.

FIG. 3 is an equivalent circuit diagram of a liquid crystal panel constituting the liquid crystal device shown in FIG. 1.

FIG. 4(*a*) is a plan view illustrating a structure of a pixel of the liquid crystal device shown in FIG. 1. FIG. 4(*b*) is a sectional view taken along the line B—B of FIG. 4(*a*).

FIG. 5 is a plan view showing an example of connection wires used in the liquid crystal device shown in FIG. 1.

FIG. 6 is a plan view showing another example of the connection wires used in the liquid crystal device shown in FIG. 1.

FIG. 7 is a plan view showing another example of the connection wires used in the liquid crystal device shown in FIG. 1.

FIG. 8 is a plan view showing another example of the connection wires used in the liquid crystal device shown in FIG. 1.

FIG. 9 is a perspective view showing an example of a portable phone as an embodiment of an electronic apparatus according to the present invention.

FIG. 10 is a partially broken plan view of another embodiment of the liquid crystal device as an example of the electro-optical device according to the present invention.

FIG. 11 is a sectional view showing a sectional structure of the liquid crystal device taken along the line II—II of FIG. 10.

FIG. 12 is a perspective view illustrating one pixel of a portion of the liquid crystal device shown in FIG. 10.

FIG. 13 is an enlarged illustration of a portion of the liquid crystal device, indicated by an arrow III of FIG. 10.

FIGS. 14(*a*) and 14(*b*) are illustrations of the relationship between connection wires and connection terminals, and FIG. 14(*a*) illustrates that the connection wires extend in a direction orthogonal to the arranging direction of the connection terminals while FIG. 14(*b*) illustrates that the connection wires extend at a slant to the arranging direction of the connection terminals.

DETAILED DESCRIPTION

First Embodiment of Electrooptical Device

An embodiment of an electro-optical device of the present invention, which is applied to an active-matrix liquid crystal device, will be described.

FIGS. 1, 2 and 3 are an exploded perspective view, a sectional view, and an equivalent circuit diagram of a liquid crystal device as an example of the electro-optical device, respectively. FIG. 4(a) is a plan view illustrating the structure of one pixel among a plurality of pixels constituting a display area of the liquid crystal device. FIG. 4(b) is a sectional view taken along the line B—B of FIG. 4(a).

As shown in FIGS. 1 and 2, a liquid crystal device 1 comprises a liquid crystal panel 2 as an electro-optical-panel, two FPC (Flexible Printed Circuit) boards 3a and 3b connected to the liquid crystal panel 2, a light guide 4 attached on a display surface of the liquid crystal device 2 (i.e., the under surface not visible in FIG. 1), and a control board 5 provided on the side opposite to the liquid crystal panel 2 of the light guide 4. LEDs 21 functioning as a light source of a backlight are provided at the end of the light guide 4.

The liquid crystal panel 2 has a pair of boards 7a and 7b that are glued to each other with an annular seal 6. By using an ACF (Anisotropic Conductive Film) 9a, a liquid-crystal-panel driver IC 8a as an electro-optical-panel driver IC is mounted on the surface of a portion, which extends out from the second board 7b, of the first board 7a. By using an ACF 9b, a liquid-crystal-panel driver IC 8b as an electro-optical-panel driver IC is also mounted on the surface (i.e., the under surface not visible in FIG. 1) of a portion, which extends out from the first board 7a, of the second board 7b. As described above, the liquid crystal device 1 of the embodiment has a so-called COG (Chip On Glass) structure.

In FIG. 1, the FPC board 3a is provided with terminals 31, which connect to terminals 13a formed on the liquid crystal panel 2. The FPC board 3b is provided with terminals 32, which connect to terminals 13b formed on the liquid crystal panel 2. The control board 5 is provided with terminals 34, which connect to terminals 33 formed on the FPC board 3a.

As shown in FIG. 2, a plurality of pixel electrodes 66 is formed on an inner surface of the first board 7a in a dot-matrix configuration viewed from the direction of an arrow A, and a polarizer 12a is glued to an outer surface of the first board 7a. A plurality of data lines 52 is also formed on an inner surface of the second board 7b in a stripe configuration when viewed from the direction of the arrow A, and a polarizer 12b is glued to an outer surface of the second board 7b. Thus, a clearance, a so-called cell gap that is enclosed by the first board 7a, the second board 7b, and the seal 6, is filled with a liquid crystal L.

The first board 7a and the second boards 7b are provided with various optical elements as required. For example, an alignment film for aligning the liquid crystal L in a given orientation is provided on each inner surface of the boards. For a color display, color filters for R (red), G (green), and B (Blue) are formed in a predetermined arrangement on portions of the second board 7b, facing the pixel electrodes formed on the first board 7a, and black matrices are formed on the portions of the second board 7b not facing the pixel electrodes. A smoothing layer is usually applied for smoothing and protecting surfaces of the color filters and the back matrices. In this configuration, counter electrodes to be provided on the second board 7b side are formed on the smoothing layer.

As shown in FIG. 3, a plurality of scanning lines 51 is formed in a line direction (i.e., the X-direction), and also the plurality of data lines 52 is formed in a column direction (i.e., the Y-direction) in the liquid crystal panel 2. Pixels 53 are formed at each intersection of the scanning lines 51 and the data lines 52. Each pixel 53 has a liquid crystal layer 54 and a TFD (Thin Film Diode) element 56 connected in series. Each scanning line 51 and each data line 52 are driven by the liquid-crystal-panel driver ICs 8a and 8b respectively.

The scanning lines 51 and the TFD elements 56 are formed on the inner surface of the first board 7a shown in FIGS. 1 and 2, and the pixel electrodes 66 formed on the inner surface of the first board 7a are connected to the scanning lines 51, while the data lines 52 serving as electrodes are formed in a stripe configuration on the inner surface of the second board 7b. The first board 7a and the second board 7b are glued to each other such that one column of pixel electrodes 66 and the corresponding data line 52 face each other. Accordingly, the liquid crystal layer 54 comprises the data lines 52 and the pixel electrodes 66, and the liquid crystal L sandwiched therebetween.

The data lines 52 and the pixel electrodes 66 are formed of a transparent conductive material such as ITO (Indium Tin Oxide). The pixel electrodes 66 may also be formed of a light reflective material such as Al (Aluminum). FIG. 3 shows that the TFD elements 56 and the liquid crystal layer 54 are connected to the sides of the scanning lines 51 and the data lines 52 respectively. The TFD elements 56 and the liquid crystal layer 54 may be connected, however, to the sides of the data lines 52 and the scanning lines 51 respectively.

The liquid crystal device 1 is provided with MIM elements 46 having a so-called Back-to-Back structure as shown in FIG. 4. Each MIM element 46 is formed of a pair of MIM element portions 46a and 46b connected in series, but electrically opposed to each other. This Back-to-Back structure allows the liquid crystal device 1 to have a more stable switching feature, compared to a liquid crystal device in which a MIM element has a single MIM element portion.

The MIM element portions 46a and 46b each have a layer structure consisting of a first metal layer 42, an insulation layer 43, and a second metal layer 44, respectively, which are respectively formed of, e.g., Ta (Tantalum), $Ta_2O_5$ and Cr (Chromium). When the MIM element 46 is used as an active element of the liquid crystal panel, the second metal layer 44 of the MIM element portion 46a on one hand is connected to a signal wire, i.e., the scanning line 51 in the embodiment, which functions as a scanning electrode or a signal electrode. The second metal layer 44 of the MIM element portion 46b on the other hand is connected to the pixel electrode 66.

One end of each connection wire 70 is connected to each scanning wire 51 as shown in FIG. 5. Each connection terminal 71 is formed at the other end of each wire of the plurality of connection wires 70. The plurality of connection terminals 71 is arrayed along an arranging direction Y. Bumps 81 serving as output terminals of the liquid-crystal-panel driver IC 8a (see FIG. 2) are connected to the connection terminals 71 through the ACF 9a. Thus, the output terminals of the liquid-crystal-panel driver IC 8a are connected to the scanning lines 51 through the connection wires 70.

FIG. 5 illustrates a conceptual wiring configuration of the connection wires 70. Each connection wire 70 lies in a first area A1, which is at least partly located outside the seal 6. The first area A1 lies between a boundary line L0 close to the connection terminals 71 and a boundary line L1 inside the seal 6, both lines extending in parallel with the arranging direction Y. Each connection wire 70 also lies in a second area A2 located inside the seal 6. The second area A2 lies between the boundary line L1 and front ends of the scanning lines 51. Each of the pluralities of connection wires 70 is arranged parallel to each other in the areas A1 and A2 respectively.

Each connection wire 70 in the first area A1 forms a first angle β1 that is an acute angle with respect to the arranging direction Y of the connection terminals 71. Each connection wire 70 in the second area A2 also forms a second angle β2 that is an acute angle with respect to the arranging direction Y. The following condition is set in this configuration:

β1>β2

As shown in FIG. 5, the connection wires 70 in the second area A2 close to the scanning lines 51 extend in a slanting direction with an acute angle α2 with respect to the extending direction of the scanning lines 51 on one side of a boundary defined by the area provided with the seal 6, and, on the other side thereof, the connection wires 70 in the first area A1 close to the terminals 71 extend in a slanting direction with an acute angle α1 with respect to the extending direction of the scanning lines 51. The following condition is set here:

α2>α1

With the angles of the connection wires 70 as described above, the distance between the plurality of connection wires 70 themselves is smaller in the second area A2 than in the first area A1. That is, the distance between the connection wires 70 is small in the second area A2 formed inside the seal 6 and close to the scanning lines 51, and is large in the first area A1 formed outside the seal 6 and close to the terminals 71.

Though damage such as corrosion is likely to occur outside a seal in general, the occurrence of the damage such as corrosion can be prevented outside the seal 6 by providing the large distance between the connection wires 70 outside the seal 6. On the other hand, inside the seal 6 where damage such as corrosion is unlikely to occur, miniaturization of the liquid crystal panel 2 can be achieved by shortening the distance between the connection wires 70 to an extent such that the distance is determined by a limitation in production such as a resist resolution in a patterning process, and by making the angle of the connection wires 70 more acute inside the seal 6.

FIG. 6 illustrates a modified configuration of the connection wires 70. Each connection wire 70 lies in the first area A1, which is at least partly located outside the seal 6. The first area A1 is surrounded by boundary lines L2 and L3 and an arraying line of the connection terminals 71. Each connection wire 70 also lies in the second area A2 located inside the seal 6. The second area A2 lies between front ends of the scanning lines 51 and the boundary line L2 as well as between front ends of the scanning lines 51 and the boundary line L3. Each connection wire 70 in the first area A1 and in the second A2 forms a first angle β1 and a second angle β2 that are acute angles with respect to the arraying direction Y of the connection terminals 71 respectively. The following condition is set in this modification:

β1>β2

In this modification, the condition is set as β1≅90°. The plurality of connection wires 70 in the first and second areas A1 and A2 are arranged parallel to each other.

As shown in FIG. 6, the connection wires 70 in the second area A2 close to the scanning lines 51 extend in a slanting direction with an acute angle α2 with respect to the extending direction of the scanning lines 51 on one side of a boundary defined by the area provided with the seal 6. On the other side thereof, the connection wires 70 in the first area A1 close to the connection terminals 71 extend in parallel with the extending direction of the scanning lines 51. Accordingly, the slanting direction α1 is set as α1=0. That is, the condition is set as α2>α1 also in this modified configuration.

With the angles of the connection wires 70 as described above, the distance between the plurality of connection wires 70 themselves is smaller in the second area A2 than in the first area A1. That is, the distance between the connection wires 70 is small in the area A2 formed inside the seal 6 and close to the scanning lines 51, and is large in the area A1 formed outside the seal 6 and close to the terminals 71.

With this configuration, occurrence of damage such as corrosion in the connection wires 70 can be prevented outside the seal 6, and miniaturization of the liquid crystal panel 2 can also be achieved by making the angle of the connection wires 70 acute inside the seal 6.

FIG. 7 illustrates another modified configuration of the connection wires. Each connection wire 70 lies in the first area A1, which is at least partly located outside the seal 6. The first area A1 lies between boundary lines L4 and L5 as well as between the boundary lines L4 and L6. Each connection wire 70 also lies in the second area A2 located inside the seal 6. The second area A2 lies between the front ends of the scanning lines 51 and the boundary line L2 as well as between the front ends of the scanning lines 51 and L3.

Each connection wire 70 also lies in a third area A3, interconnecting the connection wire in the first area A1 and that in the second area A2. The area A3 is surrounded by the boundary lines L2, L3 and L4. Further, each connection wire 70 lies in a fourth area A4 interconnecting the connection wire in the first area A1 and the corresponding connection terminal 71. The fourth area A4 is surrounded by the arraying line of the connection terminals 71 and the boundary lines L5 and L6.

The plurality of connection wires 70 is arranged parallel to each other both in the first area A1 and the second area A2.

Each connection wire 70 in the first area A1, the second area A2, and the third area A3, respectively, forms a first angle β1, a second angle β2, and a second angle β3 that are acute angles with respect to the arranging direction Y of the connection terminals 71. The connection wire 70 in the fourth area A4 is substantially orthogonal to the arranging direction Y of the connection terminals 71. The following conditions are set in this modified configuration:

β3>β1

β3>β2, and

β1≠β2

As shown in FIG. 7, the connection wires 70 in the second area A2 close to the scanning lines 51 extend in a slanting direction with an acute angle α2 to the extending direction of the scanning lines 51 on one side of a boundary defined by the area provided with the seal 6. On the other side thereof, the connection wires 70 in the first area A1 close to the terminals 71 extend in a slanting direction with an acute angle α1 with respect to the extending direction of the scanning lines 51. In this arrangement, the condition is set as α2>α1.

The plurality of connection wires 70 in the third and fourth areas A3 and A4 is formed substantially parallel to the scanning lines 51. The seal 6 is arranged partially in the first and the second areas A1 and A2.

With the angles of the connection wires 70 being set as described above, the distance between the plurality of connection wires 70 is smaller in the second area A2 than in the first area A1. That is, the distance between the connection wires 70 is small in the second area A2 formed inside the seal 6 and close to the scanning lines 51, and is large in the first area A1 formed outside the seal 6 and close to the terminals 71.

With this configuration, occurrence of damage such as corrosion in the connection wires 70 can be prevented outside the seal 6, and miniaturization of the liquid crystal panel 2 can also be achieved by making the angle of the connection wires 70 acute inside the seal 6.

FIG. 8 illustrates yet another modified configuration of the connection wires. Each connection wire 70 lies in the first area A1, which is at least partly located outside the seal 6. The first area A1 lies between the boundary line L0 close to the connection terminals 71 and the boundary line L1 in the seal 6 both extending in parallel with the arraying direction Y. Each connection wire 70 also lies in a second area A2 located inside the seal 6. The second area A2 lies between the boundary line L1 and the front ends of the scanning lines 51. The plurality of connection wires 70 in this modified configuration is formed not to be parallel to each other in the first area A1 and the second area A2. That is, the connection wires 70 are formed, e.g., to diverge from the boundary line L0 toward the boundary line L1, or from the boundary line L1 toward the scanning lines 51.

Each connection wire 70 in the first area A1 and the second area A2, respectively, forms a first angle $\beta1$ and a second angle $\beta2$ that are acute angles with respect to the arranging direction Y of the connection terminals 71. The following condition is set in this modified configuration:

$\alpha1 > \beta2$

As shown in FIG. 8, the connection wires 70 in the second area A2 close to the scanning lines 51 extend in a slanting direction with large acute angles $\alpha2$ as a whole with respect to the extending direction of the scanning lines 51 on one side of a boundary defined by the area provided with the seal 6, and, on the other side thereof, those in the first area A1 close to the terminals 71 extend in a slanting direction with small acute angles $\alpha1$ as a whole with respect to the extending direction of the scanning lines 51. That is, the following condition is set:

$\alpha2 > \alpha1$

With the angles of the connection wires 70 being set as described above, the distance between the plurality of connection wires 70 is smaller in the second area A2 than in the first area A1. That is, the distance between the connection wires 70 is small in the second area A2 formed inside the seal 6 and close to the scanning lines 51, and is large in the first area A1 formed outside the seal 6 and close to the terminals 71.

With this configuration, occurrence of damage such as corrosion in the connection wires 70 can be prevented outside the seal 6, and miniaturization of the liquid crystal panel 2 can be also achieved by making the angles of the connection wires 70 acute inside the seal 6.

Though the configurations of the connection wires interconnecting the scanning lines 51 and the liquid-crystal-panel driver IC 8a are described in the embodiment shown in FIGS. 6 to 8, connection wires 80 (see FIG. 3) interconnecting the data lines 52 and a liquid-crystal-panel driver IC 8b may be configured in the same manner as any one of the above configurations.

Embodiment of Electronic Apparatus

FIG. 9 illustrates a mobile phone as an embodiment of an electronic apparatus according to the present invention. A mobile phone 90 shown here is formed by housing various components including an antenna 91, a loud speaker 92, a liquid crystal device 1, key-switches 93, and a microphone 94 in an outer case 96 serving as a housing. Provided in the outer case 96 is a control circuit board 97 on which a control circuit is mounted for controlling operations of the above various components.

The liquid crystal device 1 includes the liquid crystal device shown in FIG. 1. Another liquid crystal device according to the present invention or an electro-optical device other than a liquid crystal device may be used. In the portable phone 90, input signals from the key-switches 93 and the microphone 94, and data received at the antenna 91 are input into the control circuit on the control circuit board 97. Then, the control circuit displays images such as numerical figures, characters, and pictures according to various input data, and also sends transmission data through the antenna 91.

Second Embodiment of Electrooptical Device

FIG. 10 is an illustration of an example of a second embodiment of the liquid crystal device. The liquid crystal device 101 shown here is formed such that a first board 102a and a second board 102b, which are disposed, in the drawing, near to and further from the observer respectively, are bonded to each other, i.e., glued together with an annular seal 103.

A region enclosed by the seal 103, the first board 102a, and the second board 102b defines a gap with a constant height, referred to as a cell gap. A liquid crystal filling port 103a is provided at one portion of the seal 103. The cell gap is filled with a liquid crystal through the liquid crystal filling port 103a. The liquid-crystal filling port 103a is sealed by a resin, for example, after completion of the filling.

The first board 102a has an overhang 102c, which extends out from the second board 102b as shown in FIG. 10. Liquid-crystal-panel driver ICs 104a and 104b are mounted on the overhang 102c by using a conductive adhesive material, e.g., an ACF (Anisotropic Conductive Film) 106. Features of the liquid-crystal-panel driver IC 104a are different from those of the liquid-crystal-panel driver IC 104b. The reason for using two types of liquid-crystal-panel driver ICs having features different from each other is that the working voltage value used for the first board 102a is different from that used for the second board 102b, i.e., working voltage value used for a drive system for scanning lines is different from that used for a drive system for signal lines, rendering it impossible to use a single type of IC chip for these two boards.

FIG. 11 illustrates a sectional structure of the liquid crystal device 101 taken along the line II—II indicated in FIG. 10. The first board 102a includes a substrate 109a. A plurality of pixel electrodes 114a is formed on the inner surface, i.e., on the surface close to the liquid crystal L, of the substrate 109a as shown in FIG. 11. As shown in FIG. 10, a plurality of straight line wiring 132 is formed in parallel with each other on the inner surface of the first board 102a in a stripe configuration. A plurality of TFD elements 133 is formed so as to be conductive to the line wiring 132, and the plurality of pixel electrodes 114a is formed in a dot-matrix configuration via these TFD elements 133. An alignment film 116a is also formed on the pixel electrodes 114a, the TFD elements 133, and the line wiring 132 as shown in FIG. 11. Next, a retardation plate 117a is formed on the outer surface of the substrate 109a, and then a polarizer 118a is formed thereon.

An example of a structure in the vicinity of a single TFD element indicated by an arrow IV in FIGS. 10 and 11 is illustrated in FIG. 12. FIG. 12 illustrates a TFD element having a so-called Back-to-Back structure. In FIG. 12, the line wiring 132 has a three layer structure consisting of a first layer 132a, a second layer 132b, and a third layer 132c formed of, e.g., TaW (Tantalum Tungsten), $Ta_2O_5$ (Tantalum Oxide) as an anodic oxide film, and Cr, respectively.

The TFD element 133 has a first TFD 133a and a second TFD 133b connected in series. The first TFD 133a and the second TFD 133b each have a three-layer structure consisting of a first metal layer 136 formed of TaW, an insulation layer 137 formed of $Ta_2O_5$ as an anodic oxide film, and a second metal layer 138 formed of Cr, which is at the same layer level as that of the third layer 132c of the line wiring 132.

When viewed from the line wiring 132, the first TFD 133a has a layered structure wherein the second metal layer 138, the insulation layer 137, and the first metal layer 136 are formed in that order. However, the second TFD 133b has a layered structure wherein the first metal layer 136, the insulation layer 137, and the second metal layer 138 are formed in that order. As described above, the TFD element is provided with a Back-to-Back structure by connecting a pair of TFD 133a and 133b in series but electrically opposing each other. This structure stabilizes the switching characteristics of the TFD element. The pixel electrode 114a is formed of, e.g., ITO so as to be conductive to the second metal layer 138 of the second TFD 133b.

As shown in FIG. 11, the second board 102b has a substrate 109b. A transflective film 11, a color filter film 112, an overcoat film 113, second electrodes 114b, and an alignment film 116b are formed on the inner surface, i.e., on the surface close to the liquid crystal L, of the substrate 109b in that order. A retardation plate 117b and a polarizer 118b are formed on the outer surface of the substrate 109b in that order.

A light guide 123 is arranged facing the second board 102b. LEDs 124 serving as a light source are arranged facing one side of the light guide 123. The light guide 123 and the LEDs 124 constitute a lighting device 126 serving as a backlight. As shown in FIG. 10, the second electrodes 114b are formed in a stripe configuration by arranging a large number of straight electrodes in parallel so as to cross the line wiring 132. To facilitate understanding of the electrode pattern, the space between adjacent second electrodes 114b is diagrammatically illustrated as an enlargement in FIG. 10; however, in practice, the space is formed very narrowly in accordance with a dot-pitch of the pixel electrodes 114a.

Intersections of the pixel electrodes 114a and the second electrodes 114b are arrayed in a dot-matrix configuration. Each intersection constitutes a single dot, and each color pattern in the color filter film 112 in FIG. 11 corresponds to a single dot. A unit formed of, e.g., the three original colors of red, green and blue of the color filter film 112 constitutes a pixel, in other words, a unit consisting of three dots constitutes a pixel.

The substrates 109a and 109b are formed of, e.g., a glass or a plastic. The transflective film 111 is formed of a light reflective material such as Al (aluminum). In order to obtain the two properties, i.e., optical transparency and light reflectivity, the transflective film 111 is processed such that the thickness thereof is reduced or such that holes for light transmission are made in the appropriate parts thereof.

The color filter film 112 is formed in a manner that pigments are applied to an appropriate pattern having, e.g., a mosaic array, a stripe array, and a delta array by known color-picture-element method forming such as ink jet method or pigment dispersion method. The overcoat film 113 is formed by evenly applying an appropriate translucent resin with, e.g., spin coating method or roll coating method.

The electrodes 114a and 114b are formed in a manner that, for example, ITO (Indium Tin Oxide) is deposited by known film deposition method such as sputtering method or vacuum deposition method, and then photo-etching method is applied to form the desired patterns thereof. The alignment films 116a and 116b are formed by, e.g., offset printing method or a method of applying polyimide solution and then baking the polyimide.

As shown in FIG. 10, the connection wires 119a are formed on the first board 102a, extending from the line wiring 132 and the connection wires 119b are connected, via conductive particles 121 dispersed in the seal, to the second electrodes 114b on the second board 102b. Terminals 122 are also formed around the edge of the overhang 102c.

To facilitate understanding of the whole liquid crystal device 101, the conductive particle 121 is indicated diagrammatically by a sectional ellipse in FIG. 11, however, a piece of conductive particles 121 is practically formed in a spherical or cylindrical shape, and is much smaller in size than the line width of the seal 103. This allows a plurality of conductive particles 121 to be present widthwise in the seal 103.

With the structure as described above, the liquid crystal device 101 according to the present embodiment functions both a reflective display and a transmission display. Referring to the FIG. 11, for the reflective display, a light coming in from the outside of the first board 102a is reflected at the transflective film 111 and fed to the layer of the liquid crystal L. For the transmission display, on the other hand, a light emitted at the LEDs 124 of the lighting device 126 is spread out to form planar light by the light guide 123 and fed to the second board 102b, and further fed to the layer of the liquid crystal L after passing through the transflective film 111.

When a light is fed to the layer of the liquid crystal L, voltage to be applied to the liquid crystal L is controlled at each pixel so that the orientation of the liquid crystal is controlled at each pixel, thereby allowing the light fed to the layer of the liquid crystal L to be modulated at each pixel, and the light modulated to be fed to the polarizer 118a. Thus, an image such as a character is displayed outside the first board 102a. The image is formed in a drive area, i.e., in a display area V which is two-dimensionally defined by pixels formed at places where the pixel electrodes 114a arrayed in a dot matrix configuration and the counter electrodes 114b opposed thereto are superposed.

FIG. 13 is an enlarged illustration of the connection wires 119b indicated by the reference character III in FIG. 10. As shown in the drawing, each connection wire 119b lies in a straight area 120a where the connection wire is substantially parallel to the line wiring 132, a second area 120b where the connection wire tilts toward the connection wire in the area 120a, a third area 120c, a first area 120d, and a fourth area 120e, the connection wire in these areas being connected to one another in that order. The connection wire in the last fourth area 120e is connected to a terminal 108 conductively connected to a bump of the liquid-crystal-panel driver IC 104b. The connection wires 119b are substantially parallel to each other in each area from 120a through 120e.

The distance between the connection wires 119b in the straight area 120a is enlarged by the connection wires in the second area 120b, leading to the corresponding distance in the third area 120c. The distance between the connection wires 119b in the third area 120c is also enlarged by the connection wires in the first area 120d, leading to the corresponding distance in the fourth area 120e.

The distance between the connection wires 119b is larger outside the seal 103, i.e., in the third area 120c, the first area 120d, and the fourth area 120e, than inside the seal 103, i.e., in the area 120a and the second area 120b. This results in large spacing of the connection wires 119b, i.e., large space formed between adjacent connection wires 119b lying outside the seal 103, thereby preventing the occurrence of corrosion in the connection wires 119b. Inside the seal 103, however, this results in forming a small distance between the connection wires 119b, leading to an overall small width of the collective connection wires 119b, thereby reducing the overall planar size of the liquid crystal device.

When the following angles of the connection wires 119b with respect to the arranging direction Y of the connection terminals 108, i.e., angles of the connection wires in the second area 120b, in the third area 120c, and in the fourth area 120e are defined, respectively, a second angle β2, a third angle β3, and a fourth angle β4, the following conditions are set among these angles:

β3>β1

β3>β2, and

β1≠β2

As shown in FIG. 13, the distance between the connection wires 119b is set to be larger in an area where the seal 103 is provided than inside the seal 103, i.e., the distance is set to be larger both in the third area 120c and the first area 120d than in the straight area 120a and the second area 120b. Though FIG. 13 illustrates a relationship between β2 and β1 as β2>β1 as one embodiment, forming an acute angle of the connection wires 70 inside the seal 6 by setting the condition of β1>β2, in a manner similar to the first embodiment as described above, realizes the miniaturization of the liquid crystal panel 2.

In the liquid crystal device according to the present embodiment, the conductive particles 121 contained in the seal 103 conductively interconnect the connection wires 119b on the first board 102a and the second electrodes 114b on the second board 102b. If spacing, i.e., a gap between the connection wires 119b lying in the area where the seal 103 is provided is small, the conductive particles 121 possibly causes short-circuiting of the wires 119b lying in the area. However, as described above, large spacing between the connection wires 119b lying in the area where the seal 103 is provided, i.e., large spacing between the connection wires in the third area 120c and the first area 120d prevents the short-circuiting of the wires 119b caused by the conductive particles 121.

Other Embodiments

Although the present invention has been described referring to preferable embodiments, it is not intended that the invention be limited to these embodiments. Various modifications within the scope of the claims of the invention will be possible.

Though FIGS. 1 and 10, e.g., show an active-matrix liquid crystal device using Back-to-Back structured TFD elements as switching elements, the present invention is applicable to a liquid crystal device using single-structured TFD elements as switching elements. The present invention is also applicable to an active-matrix liquid crystal device using TFT (Thin Film Transistor) elements instead of TFD elements as switching elements. The present invention is further applicable to a simple-matrix liquid crystal device, which does not use a switching element.

Although the electro-optical device has been explained by an example of a liquid crystal device, the present invention is also applicable to other electro-optical devices such as organic EL devices and plasma displays. Although, the electronic apparatus has been explained by an example of a mobile phone, the present invention is applicable to other electronic apparatuses such as mobile information terminals and video cameras.

Effects of the Invention

In an electro-optical device and an electronic apparatus according to the present invention, the distance between the connection wires is smaller inside the seal than outside the seal. That is, the distance between the connection wires can be large outside the seal where damage such as corrosion is likely to occur, resulting in the large spacing between the connection wires, thereby preventing occurrence of corrosion.

On the other hand, inside the seal where it is unlikely for damage such as corrosion to occur, the distance between the connection wires can be small. This small distance shortens the distance between the display area and the connection terminals, thereby resulting in a reduction in the overall planar size of the electro-optical device.

What is claimed is:

1. An electro-optical device comprising:
 a board;
 an electro-optical layer supported by the board and disposed at least in a display area;
 a seal provided at the periphery of the electro-optical layer;
 a plurality of connection terminals provided at an end of the board and arrayed along an arranging direction; and
 a plurality of connection wires provided on the board and connected to the plurality of connection terminals,
 wherein the plurality of connection wires each lies in a first area, a second area, and a third area, the connection wires in the first area lying at least partly outside the seal and forming a first angle that is an acute angle with respect to the arranging direction, the connection wires in the second area lying inside the seal and forming a second angle that is an acute angle with respect to the arranging direction, the connection wires in the third area connected to and disposed between the connection wires in the first area and in the second area and forming a third angle that is between approximately 0° and 90° with respect to the arranging direction, and
 wherein the third angle is larger than the first and the second angles, the first and the second angles are different from each other, the first, second, and third angles are measured along the same side of the connection wires, and the distance between the connection wires is smaller in the second area than in the first area.

2. The electro-optical device according to claim 1, wherein the plurality of connection wires each also lies in a fourth area, connected to the connection wires in the first area and the connection terminals, the connection wires in the fourth area being substantially orthogonal to the arranging direction.

3. The electro-optical device according to claim 2, wherein the third angle is substantially 90°.

4. The electro-optical device according to claim 1, wherein the second angle is smaller than the first angle.

5. The electro-optical device according to claim 1, wherein adjacent connection wires among the plurality of connection wires are arranged to be substantially in parallel with each other in the first, the second, and the third areas.

* * * * *